US007889131B2

(12) United States Patent
Guo et al.

(10) Patent No.: US 7,889,131 B2
(45) Date of Patent: Feb. 15, 2011

(54) BEAMFORMED SPACE TIME CODE COMMUNICATION WITH TESTING SPATIAL SIGNATURE GENERATION

(75) Inventors: Li Guo, Irving, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 290 days.

(21) Appl. No.: 12/054,765

(22) Filed: Mar. 25, 2008

(65) Prior Publication Data
US 2008/0238775 A1   Oct. 2, 2008

Related U.S. Application Data

(60) Provisional application No. 60/908,179, filed on Mar. 26, 2007.

(51) Int. Cl.
*H01Q 3/00* (2006.01)
(52) U.S. Cl. ...................................... 342/377
(58) Field of Classification Search ......... 342/376–377, 342/373, 370
See application file for complete search history.

(56) References Cited

U.S. PATENT DOCUMENTS 6,615,024 B1   9/2003   Boros et al.
6,980,527 B1   12/2005   Liu et al.

OTHER PUBLICATIONS

C. Sun et al., Combining beamforming with Alamouti scheme for multiuser MIMO communications, IEEE Vehicular Technology Conference, vol. 2, p. 1415-1419, 2004.*
Runhua Chen et al., "Multiuser Space- Time Block Coded MIMO System with Downlink Precoding," IEEE Communications Society, 2004 IEEE International Conference on Communications, vol. 5, Jun. 20, 2004, pp. 2689-2693.
PCT International Search Report and Written Opinion in counterpart International Application No. PCT/US2008/058164, dated Oct. 23, 2008.

* cited by examiner

*Primary Examiner*—Thomas H Tarcza
*Assistant Examiner*—Fred H Mull
(74) *Attorney, Agent, or Firm*—Edell, Shapiro & Finnan, LLC (57) ABSTRACT

An apparatus, logic and method are provided to improve beamformed space time code (STC) wireless communication. A first device comprising a plurality of antennas receives signals at the plurality of antennas transmitted from a first antenna of a second device. A testing spatial signature for a second antenna of the second device is computed based on the signals received at the plurality of antennas of the first device from the first antenna of the second device. Using the testing spatial signature and the signals received at the plurality of antennas of the first device from the first antenna of the second device, beamforming weights are computed to be applied to a space time code signal to be transmitted from the first device to the second device via the plurality of antennas of the first device.

30 Claims, 6 Drawing Sheets

COMPUTE TESTING SPATIAL SIGNATURE COVARIANCE MATRIX $R_2$ TO ANOTHER ANTENNA OF SECOND DEVICE FROM ALL OF THE L TIME SIGNAL OBSERVATIONS — 122

FIG.6

COMPUTE INTERMEDIATE TESTING SPATIAL SIGNATURE VECTOR $r_2$ TO ANOTHER ANTENNA OF SECOND DEVICE USING THE LATEST (IN TIME) SIGNAL OBSERVATION $r_{iL}$, WHERE $r_2 = a_L \cdot r_{iL} + b \cdot V$ — 124

COMPUTE TESTING SPATIAL SIGNATURE COVARIANCE MATRIX $R_2$ FROM $r_2$, WHERE $R_2 = r_2^H r_2$ — 126

FIG.7

BEAMFORMED SPACE TIME CODE COMMUNICATION WITH TESTING SPATIAL SIGNATURE GENERATION

CROSS REFERENCE TO RELATED APPLICATIONS

This application claims priority to U.S. Provisional Patent Application No. 60/908,179, filed Mar. 26, 2007, the entirety of which is incorporated herein by reference.

BACKGROUND

Wireless communication systems and networks have proliferated throughout numerous commercial and consumer environments. To improve the reliability of these networks, advanced wireless communication techniques are being implemented in these networks. One such technique is multiple-input multiple-output (MIMO) wireless communication where each device on a communication link is equipped with multiple transmit and receive antennas. MIMO techniques can take advantage of the multiple signal paths created by the individual antennas on both ends of the link to increase the signal-to-noise ratio (SNR) of received signals transmitted from one device to another device.

Beamforming is one wireless multi-antenna technique in which a signal to be transmitted from multiple antennas of a first device is split into multiple signals that are separately weighted (in amplitude and phase) for transmission by a corresponding one of the multiple antennas of the first device. It facilitates the control of the radiation pattern of the antenna array. Beamforming enhances the diversity of transmitted signals, improves the radio link reliability and provides robustness against multi-path fading in wireless environments. Space time coding (STC) is another method employed to improve the reliability of data transmission in wireless communication systems using multiple transmit antennas. STC systems rely on transmitting multiple, redundant copies of a data stream to a destination device with the intention that at least some of the copies of the data stream will survive the physical path to the destination device to allow for reliable decoding of the received signals at the destination device.

In a beamformed STC system, all signals transmitted from a first device to a second device are beamformed such that the signals received at the second device are coherently combined, and the signals transmitted from the multiple antennas of the first device are weighted in both phase and amplitude so that they will be coherently combined at an intended antenna of the second device. A beamformed STC system benefits from both beamforming and the STC techniques.

In beamformed STC methods heretofore known, each beam that is generated at the transmitting device could be intended for one of the antennas of the destination device, and each beam enhances the signal strength received at one of the antennas of the destination. To compute the beamforming weights, the current beamforming STC methods assume the radio channel information between each of the antennas of the destination device and the source device is known. But, in reality, only the radio channel information between the first device and one antenna of the destination device is generally known. Without the information about the channel with respect to other antennas at the destination device, the performance of current beamformed STC method could degraded significantly.

DETAILED DESCRIPTION

Overview

An apparatus, logic and method are disclosed herein to improve beamformed space time code (STC) wireless communication systems or networks. A first device comprising a plurality of antennas receives signals at the plurality of antennas transmitted from a first antenna of a second device. A testing spatial signature for a second antenna of the second device is computed based on the signals received at the plurality of antennas of the first device from the first antenna of the second device. Beamforming weights are computed from the testing spatial signature and the signals received at the plurality of antennas of the first device from the first antenna of the second device, and those beamforming weights are applied to a space time code signal to be transmitted from the first device to the second device via the plurality of antennas of the first device.

Figure 1:
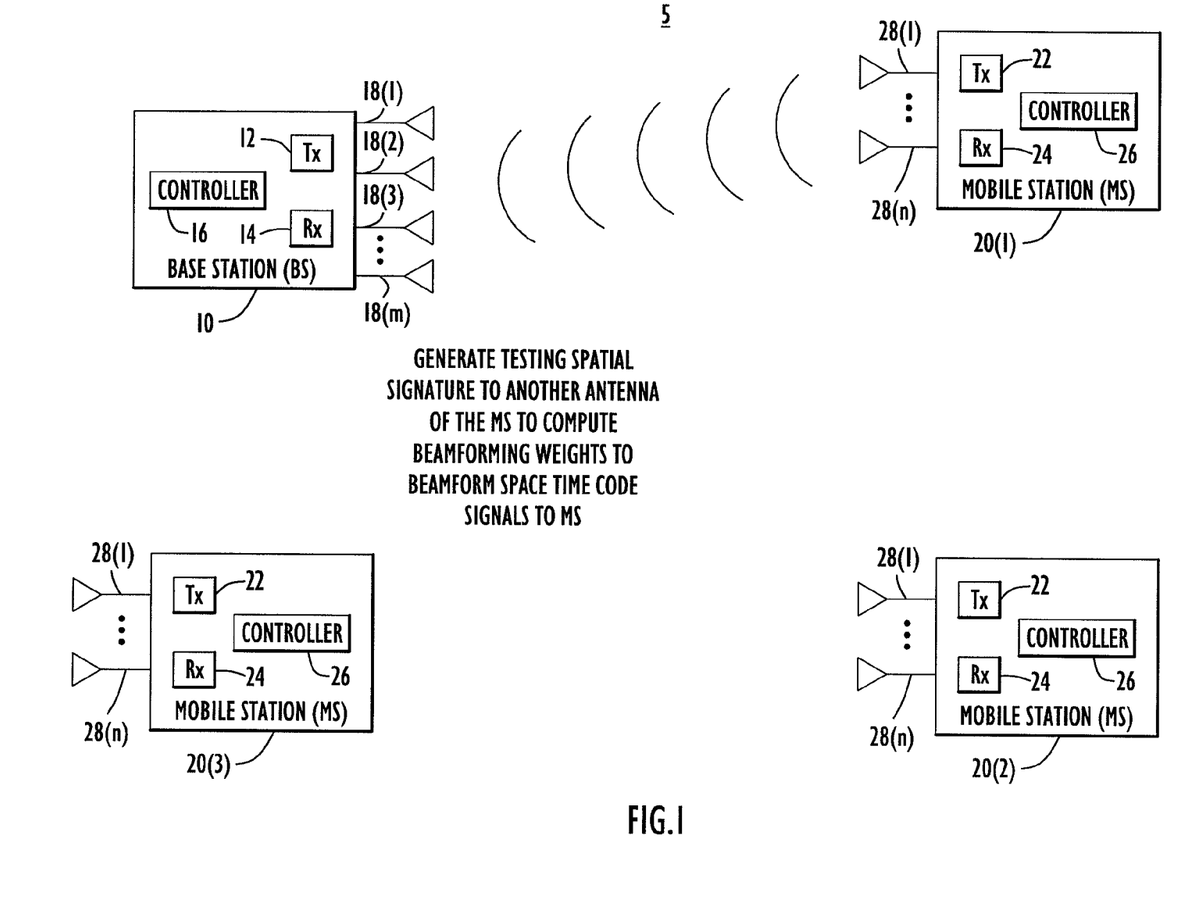
FIG. 1 is an example of a block diagram depicting a wireless communication system in which a first device generates a testing spatial signature from signals transmitted from one antenna of a second device and received at the multiple antennas of a first device.

Referring first to FIG. 1, an example of a wireless communication network or system 5 is shown comprising a base station (BS) 10 and multiple mobile stations (MSs) 20(1)-20(3). FIG. 1 shows that there is one BS and three MSs, but it should be understood that there may be additional BSs and more or less MSs and that FIG. 1 is merely an example.

The BS 10 comprises a transmitter (Tx) 12, a receiver (Rx) 14 and a controller 16. The transmitter 12 supplies transmit signals for transmission by the antennas 18(1)-18(m) and the receiver processes received signals detected by the antennas 18(1)-18(m). The controller 16 supplies the data to the transmitter 12 to be transmitted and processes signals received by the receiver 14. In addition, the controller 16 performs other transmit and receive control functionality. The BS 10 transmits and receives signals via a plurality of antennas 18(1)-18(m). Part of the functions of the transmitter 12 and receiver 14 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

Similarly, each MS 20(1)-20(3) comprises a transmitter 22, a receiver 24 and a controller 26, similar to that of the BS 10. Each MS transmits and receives signals via a plurality of antennas 28(1)-28(n).

Multiple-input multiple-output (MIMO) wireless communication may be performed between the BS 10 and any of the MSs 20(1)-20(3). MIMO techniques take advantage of the multiple signal paths created by the individual antennas on both ends of the link to increase the signal-to-noise ratio (SNR) of received signals transmitted from one device to another device. In a beamformed space time code STC system all signals transmitted between an MS and the BS 10 are beamformed. The term "beamformed" as used herein means that the signals received on multiple antennas are coherently combined, and the signals transmitted from the multiple antennas are weighted in both phase and magnitude so that they will be coherently combined at the antennas of a destination device. While FIG. 1 and the foregoing description uses the terms BS and MS, it should be understood that in general the techniques described herein are applicable when a first device wireless communicates with a second device, where the first device and second device each have a plurality of antennas. FIG. 1 shows that in general a first device may have m antennas and a second device may have n antennas.

According to the techniques described herein, the BS 10 generates a "testing" spatial signature for another antenna of a MS, e.g. MS 20(1), based on signals the BS 10 receives at its plurality of antennas 18(1)-18(m). The BS 10 uses the testing spatial signature to compute beamforming weights that are used to beamform STC signals to the MS 20(1).

Figure 2:
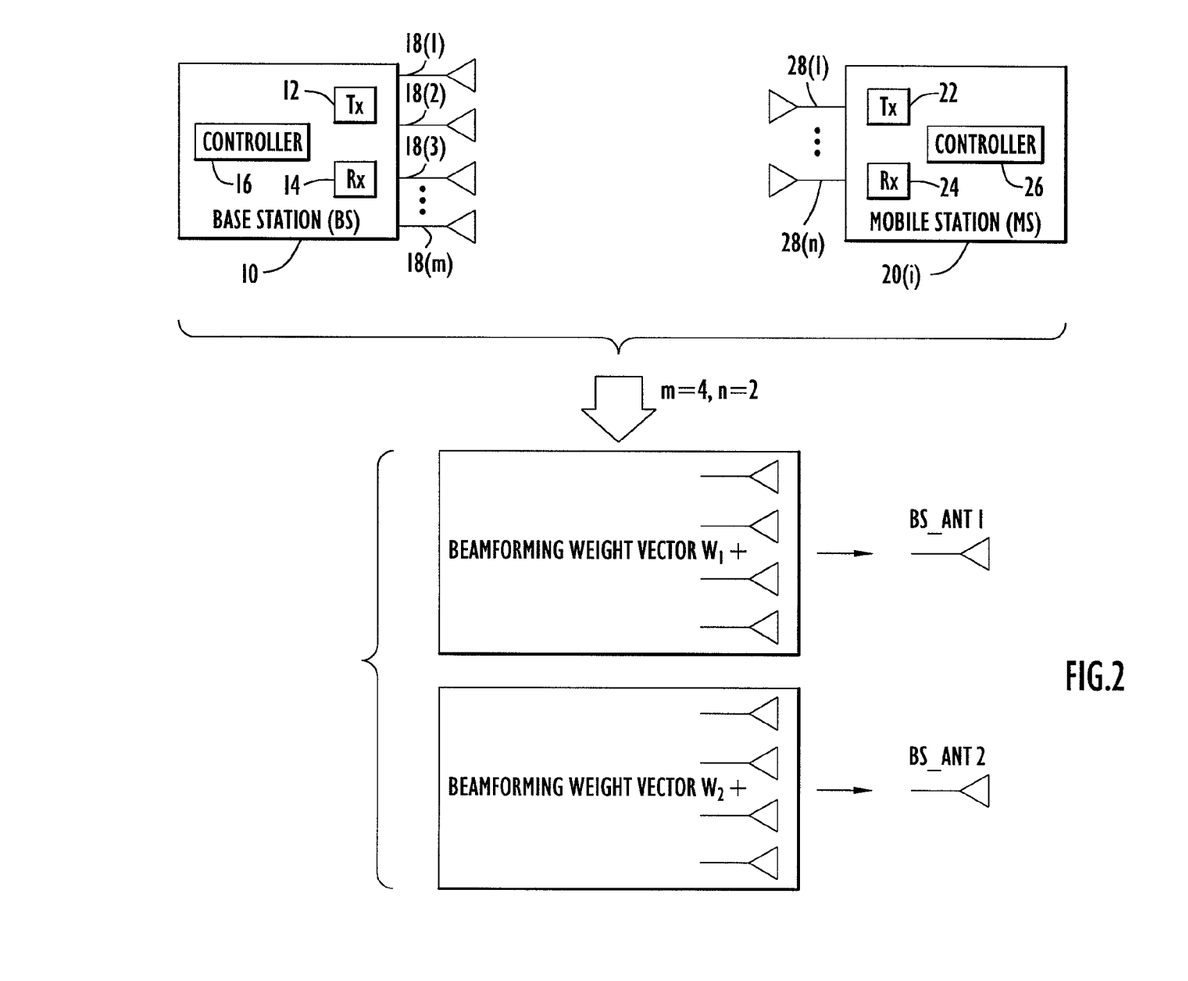
FIG. 2 is an example of a block diagram depicting a simplification of a multiple-input multiple-output (MIMO) communication link for purposes of applying beamforming to space code time signals.

Turning to FIG. 2, a beamformed STC system can be explained as follows. When a first device, e.g., BS 10, comprises four antennas (m=4), and a second device, e.g., MS 20(1), comprises two antennas (n=2), a 2×2 STC channel can be established as follows. Two beamforming weight vectors $W_1$ and $W_2$ can be applied to convert the four antennas into two effective BS antennas denoted BS_Ant1 and BS_Ant2. The BS 10 applies the weight vectors $W_1$ and $W_2$, respectively, to the signals transmitted from the four antennas to form effective transmitted signal 1 from the first BS antenna (BS_Ant1) and transmitted signal 2 from the second BS antenna (BS_Ant2). Thus, the BS 10 effectively operates like with a device with two 2 antennas as in a 2×2 STC system.

Figure 3:
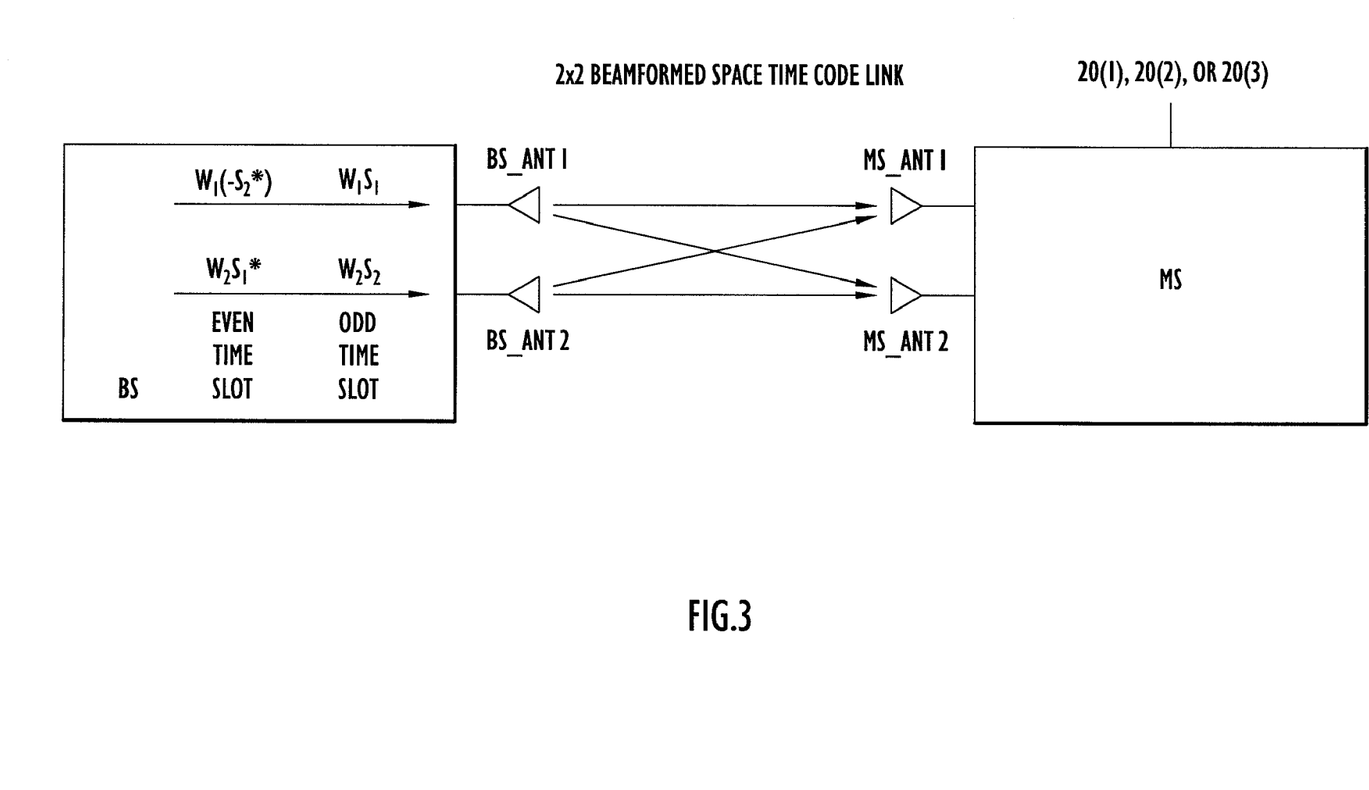
FIG. 3 is an example of a block diagram depicting application of beamforming vectors to a space time code signal transmitted from a first device to a second device.

Referring now to FIG. 3, an example of a 2×2 beamformed STC communication link is described. In this example, the so-called Alamouti Scheme is the STC technique employed, though any other STC scheme may be used. Using the Alamouti Scheme, during odd time slots, the beamforming weight vector $W_1$ (and its associated power $P_1$) is applied to beamform signal $S_1$ and the beamforming weight vector $W_2$ (and its associated power $P_3$) is applied to beamform signal $S_2$. During even time slots, beamforming weight vector $W_1$ (and is associated power $P_1$) is applied to beamform signal $-S_2^*$ and beamforming weight vector $W_2$ (and its associated power $P_2$) is applied to beamform signal $S_1^*$, where * denotes the conjugate mathematical operator.

Figure 4:
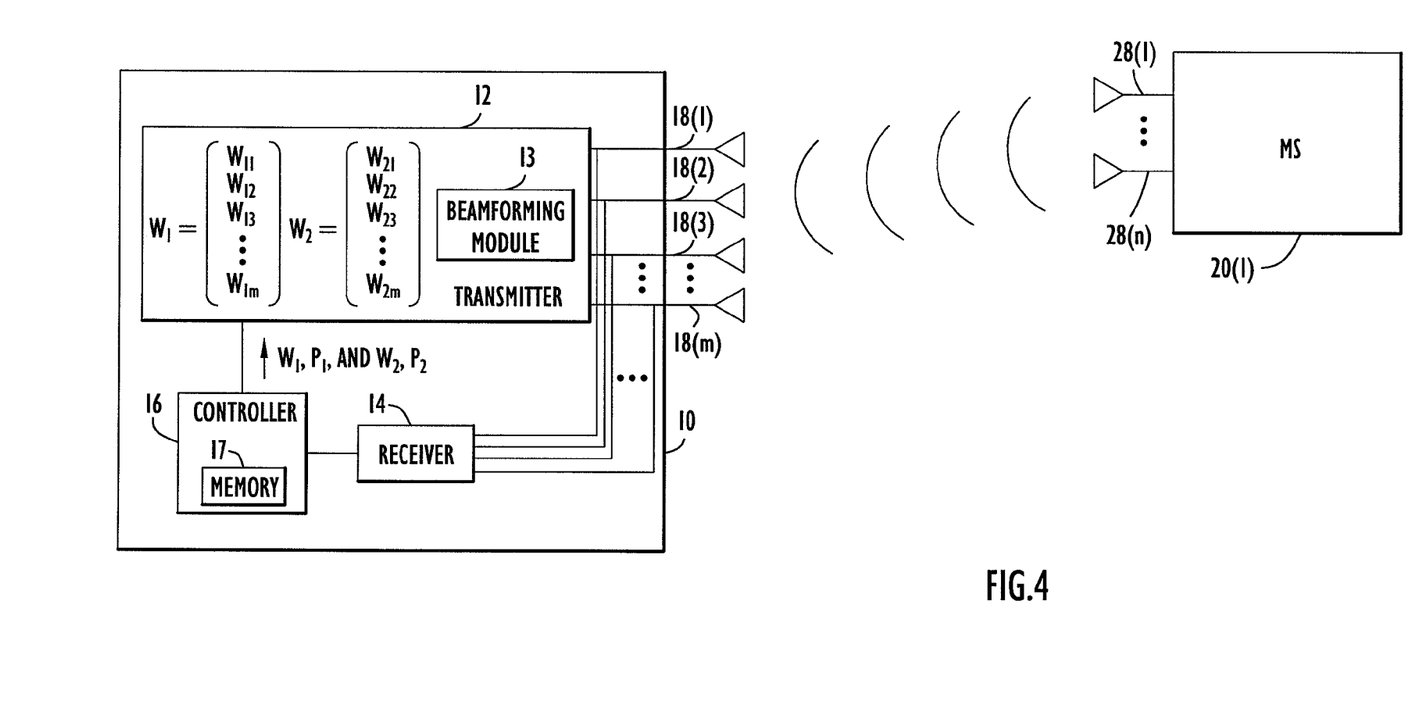
FIG. 4 is an example of a block diagram showing components of a communication device that generates the testing spatial signature to compute values of beamforming vectors for making beamforming transmission to a destination device.

FIG. 4 illustrates an example of a more detailed block diagram of a wireless device, e.g. a BS 10, that is configured to compute the beamforming vectors $W_1$ and $W_2$ for use in a beamformed STC communication link. In this example, the transmitter 12 comprises a beamforming module 13 that applies the beamforming weight vectors $W_1$ and $W_2$ to the signals to be transmitted via the plurality of antennas 18(1)-18(m) to a particular destination device, e.g., MS 20(1). As will be described in more detail hereinafter, the beamforming weight vectors $W_1$ and $W_2$ are computed using a "testing" spatial signature that is derived from signals received at the plurality of antennas 18(1)-18(m) from one of the antennas of the MS 20(1), e.g., antenna 28(1). To this end, the receiver 14 receives the signals detected by each of the antennas 18(1)-18(m) and supplies corresponding antenna-specific receive signals to controller 16. In this regard, it is understood that the receiver 14 may comprise m receiver circuits, each for a corresponding one of the antennas 18(1)-18(m). Similarly, the transmitter comprises individual transmitter circuits (after processing by the beamforming module 13) that supply the upconverted signals to the antennas 18(1)-18(m) for transmission. For simplicity, these individual receiver circuits and individual transmitter circuits are not shown. The controller 16 stores data representing the antenna-specific receive signals supplied by the receiver from signals received from one antenna of the MS 20(1), and uses this data to compute the testing spatial signature to another of the antennas of the MS 20(1), e.g., antenna 28(2), where n=2. From this testing spatial signature, the controller 16 computes values for the beamforming weight vectors $W_1$ and $W_2$.

The beamforming module 13 and controller 16 may be implemented by logic encoded in one or more tangible media (e.g., embedded logic such as an application specific integrated circuit, digital signal processor instructions, software that is executed by a processor, etc.) with memory 17 to store data used for the computations described herein (and/or to store software or processor instructions that are executed to carry out the computations described herein). While FIG. 4 shows that the controller 16 is configured to compute the testing spatial signature and the beamforming weight vectors, this is not meant to be limiting. For example, the logic to perform these computations may be implemented in a controller or block that is local and dedicated to the transmitter 12, and separate from the controller 16.

Figure 5:
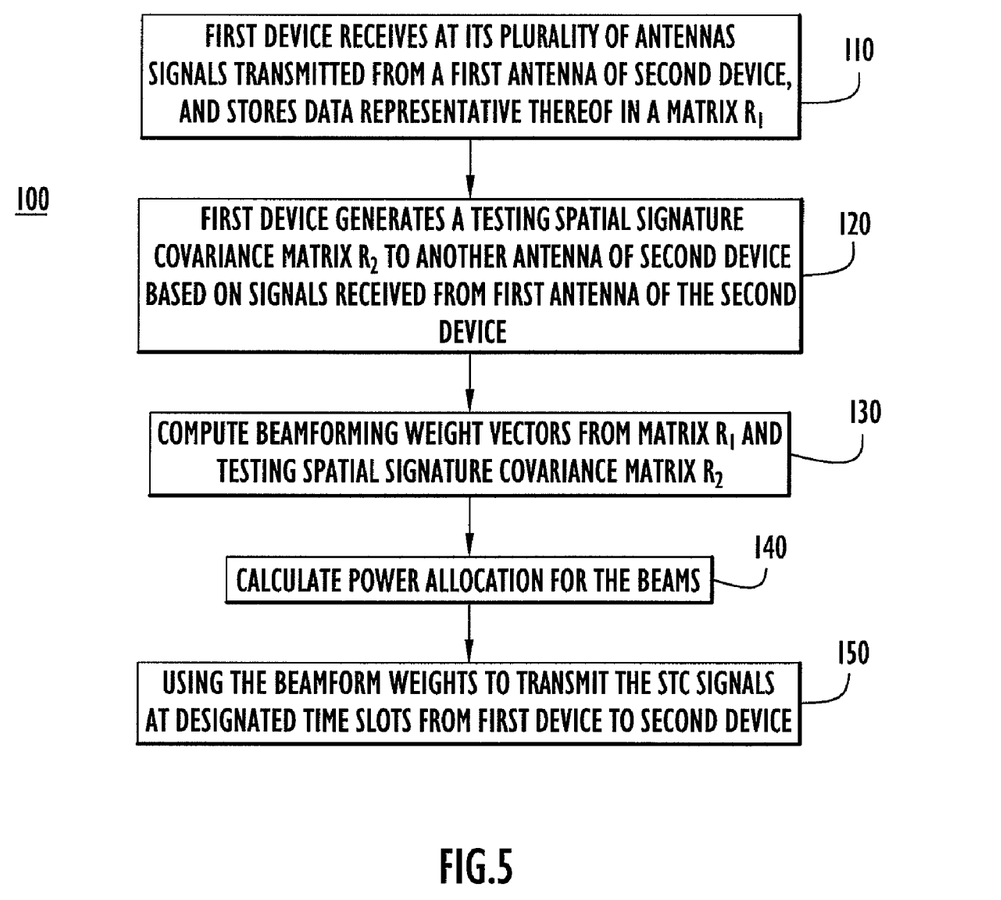
FIG. 5 is an example of a flow chart illustrating a method for generating values for the beamforming vectors from the testing spatial signature.

Turning now to FIG. 5, a flow chart depicting an example of a method 100 for computing the beamforming weight vectors $W_1$ and $W_2$ is now described. In this example, the more general terms first device and second device are used and the first device has data that is to be beamformed on STC signals to the second device. At 110, the first devices receives at its plurality of antennas signals transmitted from one antenna of the second device, e.g., a first antenna of the second device. The first device stores data in a matrix $R_1$ data representing the signals received by each of the plurality of antennas of the first device from the first antenna of the second device. For example, the first device receives at its plurality of antennas during a time period L time signal observation vectors $r_{11}, r_{12}, \ldots, r_{1L}$, from the first antenna of the second device, where vector $r_{11}$ is the earliest observation vector at the plurality of antennas of the first device during the time period and vector $r_{1L}$ is the latest observation vector at the plurality of antennas of the first device during the time period. The first device stores data representing the observation vectors as a matrix $R_1 = [r_{11}, r_{12}, r_{13}, \ldots r_{1L}]$. Each r observation vector referred to above is an 1×m vector since it consists of receive signal data for each of the m antennas of the first device, e.g., BS 10.

At 120, the first device generates a testing spatial signature covariance matrix $R_2$ for another antenna of the second device based on some or all of the data in the matrix $R_1$ that represents the signals received by the plurality of antennas of the first device from the first antenna of the second device over the time period. At 130, the first device computes the beamforming weight vectors $W_1$ and $W_2$ from the matrix $R_1$ and the testing spatial signature covariance matrix $R_2$. At 140, the first device computes the power allocated to the beams. At 150, the first device applies the beamforming weights to the STC signals to beamform them to the second device, such as described above in conjunction with FIG. 3.

There are several ways to compute the testing spatial signature covariance matrix $R_2$ at 120, as well as to compute the beamforming weight vectors at 130. Examples of implementations for computations at 120, 130 and 140 are now described.

Figure 6:
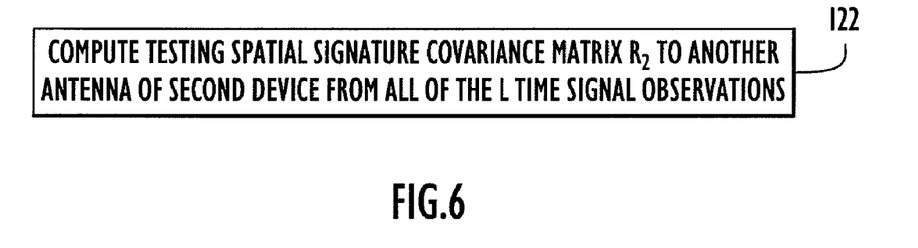
FIG. 6 is an example of a flow chart illustrating a first method for generating the testing spatial signature.

A first example of a technique for computing the testing spatial signature covariance matrix $R_2$ is described with reference to FIG. 6. In this technique, at 122, the testing spatial signature covariance matrix $R_2$ is computed directly from all of the L time signal observation vectors in matrix $R_1$. That is, $R_2$ is computed as $R_2 = a_1 \cdot r_{11}{}^H r_{11} + a_2 \cdot r_{12}{}^H r_{12} + \ldots + a_L \cdot r_{1L}{}^H r_{1L} + b \cdot V^H V$, where the observation vectors $r_{11}, r_{12}, r_{13}, \ldots r_{1L}$ are as defined above, and $a_1, a_2, \ldots, a_L$ and b are channel condition related parameters, and V is a randomly generated vector that represents a relationship between the first antenna of the second device and the second antenna of the second device. The parameters $a_1, a_2, \ldots, a_L$ (and b) make take on values between 0 and 1, they can be different for each time observation and they also may be changed dynamically. Thus, it is evident that in this technique all of the L time signal observations are used to compute the testing spatial covariance matrix $R_2$.

Figure 7:
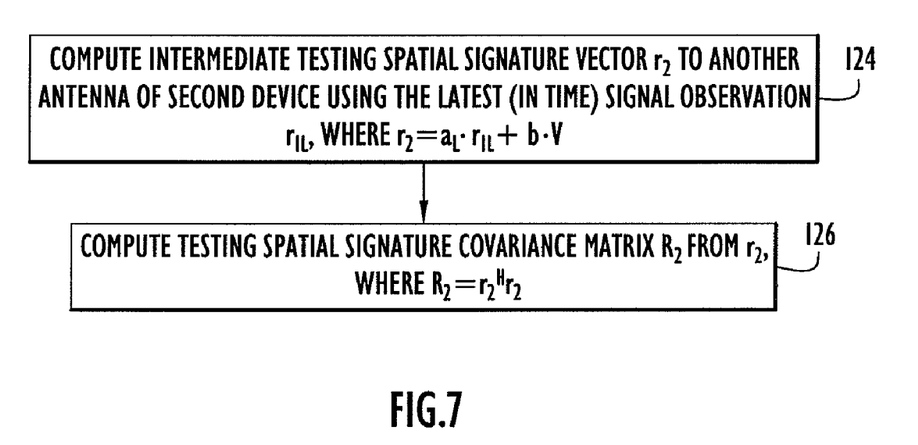
FIG. 7 is an example of a flow chart illustrating a second method for generating the testing spatial signature.

Turning to FIG. 7, another technique for computing the testing spatial signature covariance matrix $R_2$ is described. In this technique, less than all of the L time signal observations are used to compute matrix $R_2$. For example, only the latest time signal observation $r_{1L}$ is used to compute the testing spatial signature covariance matrix, and in this case it is a two step process. At 124, an intermediate testing spatial signature vector $r_2$ is computed from the latest time signal observation vector $r_{1L}$ as: $r_2 = a_L \cdot r_{1L} + b \cdot V$, where $a_L$ and b are as defined above in connection with FIG. 6. Next, at 126, the testing spatial signature covariance matrix $R_2$ is computed as $R_2 = r_2{}^H r_2$ using the intermediate testing spatial signature vector $r_2$. In general, rather than using the entire collection of L time signal observations, any one or more (but less than all) of the L time signal observations may be used to compute the testing spatial signature covariance matrix $R_2$ using a computation like the one described above in connection with FIG. 6.

There are several techniques that are possible for computing the beamforming weight vectors $W_1$ and $W_2$ from the matrix $R_1$ and the testing spatial covariance matrix $R_2$. One technique is to compute the largest eigenvalue of matrix $R_1$ and then beamforming weight vector $W1$ takes the eigenvector corresponding to the largest eigenvalue of matrix $R_1$. Similarly, the largest eignenvalue of the testing spatial covariance matrix $R_2$ is computed, and beamforming weight vector $W_2$ takes the eigenvector corresponding to the largest eigenvalue of $R_2$. As explained above, beamforming weight vectors $W_1$ and $W_2$ are m×1 vectors.

Another technique for computing the beamforming weight vectors $W_1$ and $W_2$ is to add the matrix $R_1$ and the testing spatial signature covariance matrix $R_2$ together to produce sum matrix. The first beamforming vector $W_1$ is computed such that it corresponds to the first dominant eigenvector of the sum matrix. The second beamforming vector $W_2$ is computed such that it corresponds to the second dominant eigenvector of the sum matrix.

After the two beamforming weight vectors $W_1$ and $W_2$ are computed, they are applied to the STC transmit signals to generate two beams, as described above in connection with the example of FIG. 3. Given the total power available at the transmitters, the power partition between these two beams may be achieved by normalizing the weight vectors $W_1$ and $W_2$ as follows:

$$W_1 = \sqrt{2A} \cdot W_1$$

$$W_2 = \sqrt{2(1-A^2)} \cdot W_2$$

where A is a constant with a value between 0 and 1.

In beamformed STC methods heretofore known, the beams that are generated at the transmitting device are only intended for one of the antennas of the destination device, and the signal strength at other antennas of the destination device is ignored in computing the weight vectors. That is, the beamforming weight vectors in the current beamformed STC methods do not take into account other antennas at the destination device. However, the transmitting device inevitably receives signals from all of the antennas at that destination device. Therefore, a better approach is to boost the signal strength intended to all of the antennas of the destination device. By generating the testing spatial signature for other antennas of the destination device based on signals from one antenna of the destination device, the beamforming weight vectors can be computed so as to achieve desired receive signal strength at all antennas of the destination device when beamformed STC signals using those weight vectors to that destination device.

While in some examples described herein, reference is made to a 2×2 STC communication link, it should be understood that the techniques described herein are applicable in general to a system where the first device has m antennas and the second device has n antennas. The first device receives signals from one antenna of the second device and uses data from those received signals to compute a testing spatial signature to any other antenna of the second device. The testing spatial signature is then used to compute the beamforming vectors that the first device applies to a STC signal that are to be beamformed to the second device.

Although the apparatus, system, and method for the STC beamforming techniques are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method for the STC beamforming techniques, as set forth in the following claims.

What is claimed is:

1. A method comprising:
   at a first device comprising a plurality of antennas, receiving signals transmitted from a first antenna of a second device;
   generating a testing spatial signature covariance matrix for a second antenna of the second device based on the signals received at the plurality of antennas of the first device from the first antenna of the second device; and
   based on the testing spatial signature covariance matrix and the signals received at the plurality of antennas of the first device from the first antenna of the second device, computing beamforming weights to be applied to a space time code signal to be transmitted from the first device to the second device via the plurality of antennas of the first device.

2. The method of claim 1, and further comprising transmitting the space time code signal using the beamforming weights from the first device to the second device.

3. The method of claim 1, wherein receiving comprises receiving signals at the plurality of antennas of the first device from the first antenna of the second device over a time period, and further comprising storing data representing the signals received at each of the plurality of antennas at a plurality of observation times during the time period.

4. The method of claim 3, wherein storing comprises storing data for a matrix $R_1$ from the data representing the signals received at the plurality of antennas of the first device from the first antenna of the second device, where $R_1=[r_{11}, r_{12}, r_{13}, \ldots r_{1L}]$, and $r_{12}, \ldots, r_{1L}$ are L observations of signals received at the plurality of antennas of the first device from the first antenna of the second device, where $r_{11}$ is the earliest observation and $r_{1L}$ is the latest observation during the time period, and wherein generating comprises computing the testing spatial signature covariance matrix $R_2$ from the matrix $R_1$.

5. The method of claim 4, wherein computing comprises computing the testing spatial signature covariance matrix $R_2$ from $r_{11}, r_{12}, \ldots, r_{1L}$ which are time signal observation vectors of matrix $R_1$.

6. The method of claim 5, wherein computing the testing spatial signature is based on less than all of the L observations.

7. The method of claim 6, wherein computing comprises computing an intermediate testing spatial signature vector $r_2$ from the latest time signal observation vector $r_{1L}$, and computing the testing spatial signature covariance matrix $R_2$ from the intermediate testing spatial signature vector $r_2$.

8. The method of claim 4, wherein computing the beamforming weights comprises computing a first beamforming vector $W_1$ for use in transmissions during odd time slots of the space time code signal and a second beamforming vector $W_2$ for use in transmissions during even time slots of the space time code signal.

9. The method of claim 8, wherein computing the beamforming weights comprises computing the first beamforming vector $W_i$ that is an eigenvector that corresponds to a largest eigenvalue of the matrix $R_1$, and computing the second beamforming vector $W_2$ that is an eigenvector that corresponds to a largest eigenvalue of the testing spatial signature covariance matrix $R_2$.

10. The method of claim 8, wherein computing the beamforming weights comprises adding the matrix $R_1$ to the testing spatial signature covariance matrix $R_2$, and computing the first beamforming vector $W_i$ that corresponds to a first dominant eigenvector of a sum matrix resulting from the addition of the matrices $R_1$ and $R_2$ and computing the second beamforming vector $W_2$ that corresponds to a second dominant eigenvector of the sum matrix resulting from the addition of the matrices $R_1$ and $R_2$.

11. The method of claim 8, and further comprising partitioning power among the plurality of antennas of the first device by normalizing the first beamforming vector $W_1$ and the second beamforming vector $W_2$ such that:

$$W_1 = \sqrt{2A} \cdot W_1$$

$$W_2 = \sqrt{2(1-A^2)} \cdot W_2, \text{ where A is a value between zero and 1.}$$

12. An apparatus comprising:
a plurality of antennas;
a transmitter coupled to the plurality of antennas, the transmitter that is configured to apply beamforming weights to a space time code signal to be beamformed and transmitted from the plurality of antennas to a destination device; and
a controller coupled to the beamforming module that is configured to compute the beamforming weights used by the beamforming module by generating a testing spatial signature covariance matrix for a second antenna of the destination device based on the signals received at the plurality of antennas from a first antenna of the destination device, and to compute the beamforming weights based on the testing spatial signature covariance matrix and the signals received at the plurality of antennas from the first antenna of the destination device.

13. The apparatus of claim 12, wherein the controller stores data representing signals received at each of the plurality of antennas from the first antenna of the destination device over a time period, wherein the data represents signals received at each of the plurality of antennas at a plurality of observation times during the time period.

14. The apparatus of claim 13, wherein the controller stores data for a matrix $R_1$ from the data representing the signals received at the plurality of antennas from the first antenna of the destination device, where $R_1=[r_{11}, r_{12}, r_{13}, \ldots r_{1L}]$ and $r_{11}, r_{12}, \ldots, r_{1L}$ are L observations of signals received at the plurality of antennas of the first device from the first antenna of the destination device, where $r_{11}$ is the earliest observation and $r_{1L}$ is the latest observation during the time period, and computes the testing spatial signature covariance matrix $R_2$ from the matrix $R_1$.

15. The apparatus of claim 14, wherein the controller computes the testing spatial signature covariance matrix $R_2$ from $r_{11}, r_{12}, \ldots, r_{1L}$ which are time signal observation vectors of matrix $R_1$.

16. The apparatus of claim 14, wherein the controller computes the testing spatial signature covariance matrix $R_2$ based on less than all of the L observations.

17. The apparatus of claim 16, wherein the controller computes the testing spatial signature covariance matrix $R_2$ by computing an intermediate testing spatial vector $r_2$ from the latest time signal observation vector $r_{1L}$ and computing the testing spatial signature covariance matrix $R_2$ from the intermediate testing spatial signature vector $r_2$.

18. The apparatus of claim 14, wherein the controller computes a first beamforming vector for use in transmissions during odd time slots of the space time code signal and a second beamforming vector for use in transmissions during even time slots of the space time code signal.

19. The apparatus of claim 18, wherein the controller computes the first beamforming vector that is an eigenvector that corresponds to a largest eigenvalue of the matrix $R_1$, and computes the second beamforming vector that is an eigenvector that corresponds to a largest eigenvalue of the testing spatial signature covariance matrix $R_2$.

20. The apparatus of claim 18, wherein the controller computes the beamforming weights by adding the matrix $R_1$ to the testing spatial signature covariance matrix $R_2$, and computing the first beamforming vector that corresponds to a first dominant eigenvector of a sum matrix resulting from the addition of the matrices $R_1$ and $R_2$ and computing the second beamforming vector that corresponds to a second dominant eigenvector of the sum matrix resulting from the addition of the matrices $R_1$ and $R_2$.

21. The apparatus of claim 18, wherein the controller computes the first and second beamforming vectors $W_1$ and $W_2$ so as to partition power among the plurality of antennas by normalizing the first and second beamforming vectors $W_1$ and $W_2$ such that:

$$W_1 = \sqrt{2A} \cdot W_1$$

$$W_2 = \sqrt{2(1-A^2)} \cdot W_2, \text{ where A is a value between zero and 1.}$$

22. A tangible media encoded with instructions for execution by a processor, and when executed operable to cause the processor to:

at a first device comprising a plurality of antennas, generate a testing spatial signature covariance matrix for a second antenna of a second device based on signals received at the plurality of antennas of the first device from a first antenna of the second device; and based on the testing spatial signature covariance matrix and the signals received at the plurality of antennas of the first device from the first antenna of the second device, compute beamforming weights to be applied to a space time code signal to be transmitted from the first device to the second device via the plurality of antennas of the first device.

23. The tangible media of claim 22, and further comprising instructions that cause the processor to store data for a matrix $R_1$ from data representing the signals received at the plurality of antennas of the first device from the first antenna of the second device, where $R_1=[r_{11}, r_{12}, r_{13}, \ldots, r_{1L}]$, and $r_{11}, r_{12}, \ldots, r_{1L}$ are L observations of signals received at the plurality of antennas of the first device from the first antenna of the second device, where $r_{1,1}$ is the earliest observation and $r_{1L}$ is the latest observation during the time period, and wherein the logic for computing the testing spatial signature comprises logic for computing the testing spatial signal covariance matrix $R_2$ from the matrix $R_1$.

24. The tangible media of claim 23, wherein the instructions that cause the processor to compute the testing spatial signature covariance matrix $R_2$ comprise instructions that cause the processor to compute the matrix $R_2$ from $r_{11}, r_{12}, \ldots, r_{1L}$ which are time signal observation vectors of matrix $R_1$.

25. The tangible media of claim 23, wherein the instructions that cause the processor to compute the testing spatial signature covariance matrix $R_2$ comprise instructions that cause the processor to compute the testing spatial signature covariance matrix $R_2$ based on less than all of the L observations.

26. The tangible media of claim 25, wherein the instructions that cause the processor to compute the testing spatial signature covariance matrix $R_2$ comprise instructions that cause the processor to compute an intermediate testing spatial vector $r_2$ from the latest time signal observation vector $r_{1L}$, and to compute the testing spatial signature covariance matrix $R_2$ from the intermediate testing spatial signature vector $r_2$.

27. The tangible media of claim 23, wherein the instructions that cause the processor to compute the beamforming weights comprise instructions that cause the processor to compute a first beamforming vector $W_1$ for use in transmissions during odd time slots of the space time code signal and a second beamforming vector $W_2$ for use in transmissions during even time slots of the space time code signal.

28. The tangible media of claim 27, wherein the instructions that cause the processor to compute the beamforming weights comprise instructions that cause the processor to compute the first beamforming vector $W_1$ that is an eigenvector that corresponds to a largest eigenvalue of the matrix $R_1$, and to compute the second beamforming vector $W_2$ that is an eigenvector that corresponds to a largest eigenvalue of the testing spatial signature covariance matrix $R_2$.

29. The tangible media of claim 27, wherein the instructions that cause the processor to compute the beamforming weights comprise instructions that cause the processor to add the matrix $R_1$ to the testing spatial signature covariance matrix $R_2$, and computes the first beamforming vector $W_1$ that corresponds to a first dominant eigenvector of a sum matrix resulting from the addition of the matrices $R_1$ and $R_2$ and computes the second beamforming vector $W_2$ that corresponds to a second dominant eigenvector of the sum matrix resulting from the addition of the matrices $R_1$ and $R_2$.

30. The tangible media of claim 27, and further comprising instructions that cause the processor to partition power among the plurality of antennas of the first device by normalizing the first beamforming vector $W_1$ and the second beamforming vector $W_2$ such that:

$$W_1 = \sqrt{2}A \cdot W_1$$

$$W_2 = \sqrt{2(1-A^2)} \cdot W_2$$

where A is a value between zero and 1.

* * * * *